United States Patent [19]

Jedlinski et al.

[11] 4,281,074
[45] Jul. 28, 1981

[54] PROCESS OF MANUFACTURING CURED UNSATURATED POLYESTER RESINS WITH A REGULAR NETWORK STRUCTURE

[75] Inventors: Zbigniew Jedlinski, Gliwice; Antoni Kotas, Zabrze; Boleslaw Ryndak, Debica; Stanislaw Mazur, Debica; Jan Czarnecki, Debica; Mieczyslaw Walkowicz, Debica; Stanislaw Jedlinski, Debica, all of Poland

[73] Assignee: Polska Akademia Nauk, Zaklad Polimerow, Zabrze, Poland

[21] Appl. No.: 124,933

[22] Filed: Feb. 26, 1980

Related U.S. Application Data

[63] Continuation-in-part of Ser. No. 936,938, Aug. 25, 1978, abandoned.

[30] Foreign Application Priority Data

Sep. 2, 1977 [PL] Poland .................................. 200683

[51] Int. Cl.³ ........................................... C08L 67/00
[52] U.S. Cl. ...................................... 525/40; 525/27; 525/35; 525/36; 525/39; 525/445; 528/190; 528/192; 528/194; 528/298
[58] Field of Search ...................... 525/27, 35, 36, 40, 525/445, 39; 528/190, 192, 194, 298

[56] References Cited

FOREIGN PATENT DOCUMENTS

| 57016 | 4/1966 | Poland | 525/445 |
| 87109 | 3/1974 | Poland | 525/445 |
| 836438 | 11/1956 | United Kingdom | 525/445 |
| 852886 | 12/1956 | United Kingdom | 525/445 |
| 170664 | 6/1965 | U.S.S.R. | 525/445 |
| 170666 | 6/1965 | U.S.S.R. | 525/445 |

*Primary Examiner*—J. Ziegler
*Attorney, Agent, or Firm*—Haseltine & Lake

[57] ABSTRACT

In the first stage a mixture of a crude diene adduct of 2-naphthol with maleic anhydride is polycondensed at a temperature within the range from 180° to 200° C. with excess glycol or with a dihydric aromatic alcohol, from 0.1 to 3 moles of the alcohol being used per 1 mole of the adduct. In the second stage, the thus obtained product is condensed at a temperature within the range from 160° to 210° C. with an unsaturated acid or the anhydride thereof and with the addition of an equimolar quantity (with respect to the acid or its anhydride) of glycol and/or a dihydric aromatic alcohol. The resulting product is then dissolved in styrene and copolymerized to obtain a cured polyester resin. Propylene glycol, diethylene glycol, dipropylene glycol or butylene glycol may be used as the glycol. The $C_2$ or $C_4$ alkoxy derivatives of 2,2-bis(p-hydroxyalkoxyphenyl) propane, of bis(hydroxyalkoxy)binaphthyl or of bis(hydroxyalkoxynaphthyl) methane may be used as the dihydric aromatic alcohol. Maleic acid, fumaric acid or anhydrides thereof are the unsaturated acid or anhydride components used.

4 Claims, No Drawings

PROCESS OF MANUFACTURING CURED UNSATURATED POLYESTER RESINS WITH A REGULAR NETWORK STRUCTURE

CROSS REFERENCE TO RELATED APPLICATION

This is a continuation-in-part application of Ser. No. 936,938, filed Aug. 25, 1978, abandoned.

BACKGROUND OF THE INVENTION

The object of the present invention is to provide a process for manufacturing chemically resistant and thermally stable unsaturated polyester resins possessing a regular network structure.

A three-stage process for manufacturing unsaturated polyester resins has been described in U.S. Pat. No. 3,901,953. A dialkyl terephthalate is reacted with a polyhydric alcohol in the first stage, the reaction product being polycondensed in the second stage with an unsaturated dicarboxylic acid, a polyhydric alcohol or with a saturated dicarboxylic acid. In the third stage, the thus obtained unsaturated polyester is dissolved in a vinyl monomer to yield an unsaturated polyester resin. The first and second reaction steps are carried out in the presence of hydroquinone and a phosphite.

Polish Pat. No. 57016 (corresponding to DOS No. 1745 241) and No. 87109 disclose polyester manufacturing processes based on the simultaneous introduction of an unsaturated acid anhydride e.g. maleic anhydride, and a glycol, e.g. 1,2-propylene glycol, into the reacton medium in addition to a diene adduct of 2-naphthol and maleic anhydride, the molar ratio of the total acid components to glycols being equal to 1. Linear unsaturated polyesters obtained by the above methods feature a random arrangement of double bonds along the chain. Unsaturated polyester resins are obtained from the aforementioned polyesters by dissolving them in crosslinking monomers, e.g. styrene, which give, on crosslinking, cured polyester resins having a random, irregular network structure, which in turn results in a deterioration of their physical and mechanical properties and chemical resistance.

It is the object of the present invention to produce a cured polyester resin with improved physical, mechanical and chemical resistance properties.

SUMMARY OF THE INVENTION

The process according to the invention consists in that, in the first stage, a mixture of the crude adduct of 2-naphthol and maleic anhydride is polycondensed at a temperature within the range of 180° to 200° C. with excess glycol and/or with a dihydric aromatic alcohol, from 0.1 to 3 moles of the alcohol being employed per 1 mole of said adduct. In the second stage the thus obtained product is condensed at a temperature within the range of 160° to 210° C. with an unsaturated acid or the anhydride thereof and with the addition of an equimolar quantity (with respect to the acid or its anhydride used) of a glycol and/or a dihydric aromatic alcohol. The product thus obtained is dissolved in styrene and copolymerized to produce a cured polyester resin.

DETAILED DESCRIPTION

In the method according to the invention, propylene glycol, dipropylene glycol and butylene glycol are examples of the glycols which may be used. Examples of the dihydric aromatic alcohol are the $C_2$ and $C_4$ alkoxy derivatives of 2,2-bis(p-hydroxyalkoxyphenyl) propane, bis(hydroxyalkoxy) binaphthyl or of bis(hydroxyalkoxynaphthyl) methane may be used. Derivatives containing multiple alkoxy groups can also be used, e.g. those containing $HO(CH_2CH_2O)_n$-groups. The unsaturated acids or anhydrides used are maleic acid, fumaric acid and their anhydrides.

The synthesis controlled according to the invention was found to lead in the first stage of the reaction to the formation of unsaturated oligoesters produced in the reaction of excess glycol or dihydric aromatic alcohol with the adduct of 2-naphthol and maleic anhydride. The subsequent addition of maleic anhydride or an unsaturated acid and an equimolar quantity of glycol or dihydric aromatic alcohol to the unsaturated acid or anhydride in the second stage of the reaction results in the formation of an alternating arrangement of the sequences of saturated and unsaturated oligoesters in the polyester chain. Block polyesters obtained in that reaction are copolymerized with styrene to produce a cured polyester resin exhibiting, besides an increased chemical resistance, physical and mechanical properties 20 percent superior to those of cured polyester resins obtained by hitherto known techniques.

The tensile and flexural strengths along with the elongation at break of the glass-reinforced laminates produced from resins obtained by the process according to the invention are increased by some 20 percent in comparison with those of laminates produced using resins obtained by hitherto known techniques. It is to be noted that the said advantageous mechanical strength properties of glass-reinforced laminates refer to those measured at a temperature of 115° C.

The obtained products are insensitive to the prolonged action of strong inorganic and organic acids such as, for instance, hydrochloric, sulfuric and lactic acids, while also being resistant to the action of liquid fuels and solvents such as benzene, xylene, toluene, n-hexane and alcohols, and to the action of solutions of salts and bases, industrial wastes, etc.

The illustrative examples set forth hereinbelow merely typify the spirit of the invention and are not considered to be limitations thereof.

The adduct of maleic anhydride and 2-naphthol has the structure

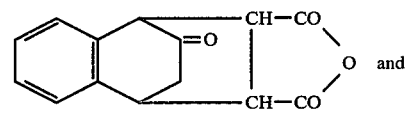 and and is described in P. Penczek, Plaste u. Kautschuk 9 425, 1962 and K. Takeda and K. Kitahonoki, J. pharmac. Soc. Japan 73 280 1953; C.A. 48:2019a. The adduct used in the following examples is prepared by a modified version of the method of Takeda et al in that the reactants are reacted gradually rather than all at one time and the adduct is not purified nor crystallized prior to use.

Specifically, the adduct was prepared by gradually adding 1 mole of 2-naphthol to 1.4 moles of maleic anhydride in the absence of a solvent over a period of 70–90 minutes during which time the temperature increased from 140° C. to 215° C. After all of the 2-naphthol had been added, the temperature of the reaction mixture was maintained at 210°–215° C. for 90 min. The reaction mixture containing the excess maleic anhydride was cooled and used directly in the polycondensation reaction as illustrated in the following examples.

EXAMPLE 1

1 mole of the adduct of maleic anhydride and 2-naphthol and 1.6 moles of 1,2-propylene glycol are heated for several hours at a temperature of 180° C. under a blanket of nitrogen and with constant stirring in a reaction vessel fitted with a reflux condenser until an acid number of 40 mg KOH/g is attained.

After the reaction mixture has been cooled down to 160° C., 1 mole of maleic anhydride and 0.6 mole of 1,2-propylene glycol are fed into the reaction vessel and the temperature is gradually increased up to 205° C., the polycondensation process being conducted until a polyester having an acid number of from about 35 to 42 mg KOH/g is obtained.

The resulting polyester at a temperature of 150° C. is poured onto a cooled metal belt conveyor. The product is copolymerized with styrene.

EXAMPLE 2

2 moles of the adduct of maleic anhydride and 2-naphthol are heated with 2.5 moles of dipropylene glycol at a temperature of 190° C. until an acid number of 40 mg KOH/g is attained. After the esterification mixture has been cooled down to 160° C., 1 mole of maleic anhydride and 0.8 mole of dipropylene glycol are fed in and the temperature gradually increased up to 205° C. until a polyester having an acid number of from about 35 to 42 mg KOH/g is obtained.

The resulting polyester is then poured onto a cooled metal belt conveyor. The product is copolymerized with styrene.

EXAMPLE 3

1 mole of the adduct of maleic anhydride and 2-naphthol and 1.3 moles of 1,2-propylene glycol are heated under a blanket of an inert gas and with constant stirring in a reaction vessel fitted with a reflux condenser, the temperature being gradually increased from 130° to 200° C. as the reaction proceeds. After the reaction mixture temperature has reached 200° C., the synthesis is conducted until an acid number of 40 mg KOH/g is attained.

After the esterification mixture has been cooled down to 140° C., 1 mole of bis(hydroxyethoxy)-1,1-binaphthyl and 1.1 moles of maleic anhydride are fed in and the mixture heated at a temperature of 205° C. until the acid number of the mixture is equal to 35 mg/KOH/g. The product is then copolymerized with styrene.

EXAMPLE 4

1 mole of the adduct of maleic anhydride and 2-naphthol and 1.3 moles of 1,2-propylene glycol are heated under a blanket of an inert gas and with constant stirring in a reaction vessel fitted with a reflux condenser, the process temperature being gradually increased from 130° to 200° C. as the reaction proceeds. After the reaction mixture temperature has reached 200° C., the synthesis is conducted until an acid number of 40 mg KOH/g is attained.

After the esterification mixture has been cooled down to 140° C., 1 mole of bis(hydroxyethoxynaphthy) methane and 1.1 moles of maleic anhydride are fed in and the mixture heated at a temperature of 210° C. until a polyester having an acid number of 35 mg KOH/g is obtained. The product is then copolymerized with styrene.

EXAMPLE 5

1 mole of the adduct of maleic anhydride and 2-naphthol and 1.3 moles of 1,2-propylene glycol are heated under a blanket of an inert gas and with constant stirring in a reaction vessel fitted with a reflux condenser, the process temperature being gradually increased from 130° to 200° C. as the reaction proceeds. After the reaction mixture temperature has reached 200° C., the synthesis is conducted until an acid number of 40 mg KOH/g is attained.

After the esterification mixture has been cooled down to 140° C., 1 mole of propoxylated Bisphenol A, i.e. 2,2-bis[p-(2'-hydroxy-2'-methylethoxy)phenyl] propane and 1.1 moles of maleic anhydride are fed in and the mixture heated up to 200° C. until a polyester having an acid number of 35 mg KOH/g is obtained. The product is copolymerized with styrene.

EXAMPLE 6

1 mole of the adduct of maleic anhydride and 2-naphthol and 1.6 moles of 1,2-propylene glycol are heated under a blanket of an inert gas and with constant stirring in a reaction vessel fitted with a reflux condenser, the process temperature being gradually increased from 130° to 200° C. as the reaction proceeds and then kept constant at 200° C.

When an acid number of 45 mg KOH/g has been attained, the esterification mixture is cooled down to 160° C. and 1 mole of fumaric acid and 0.6 mole of 1,2-propylene glycol added, the mixture then being gradually heated up to 205° C. until a polyester having an acid number of 35 mg KOH/g is obtained. The product is then copolymerized with styrene.

EXAMPLE 7

1 mole of maleic anhydride and 2-naphthol and 1.3 moles of 1,2-propylene glycol are heated under a blanket of an inert gas in a reaction vessel fitted with a reflux condenser. The reaction mixture is stirred and its temperature increased gradually from 130° to 200° C. as the reaction proceeds. After the reaction mixture temperature has reached 200° C., the synthesis is conducted until an acid number of 40 mg KOH/g is attained.

After the esterification mixture temperature has been cooled down to 140° C., 1 mole of propoxylated Bisphenol A and 1.1 moles of fumaric acid are fed in and the mixture heated at a temperature of 200° C. until a polyester having an acid number of 35 mg KOH/g is obtained. The product is then copolymerized with styrene.

EXAMPLE 8

1 mole of the adduct of maleic anhydride and 2-naphthol and 1.6 moles of 1,4-butylene glycol are heated for several hours at a temperature of 200° C. under a blanket of nitrogen and with constant stirring in a reaction vessel fitted with a reflux condenser until an acid number of 40 mg KOH/g is attained.

After the reaction mixture has been cooled down to 180° C., 1 mole of maleic anhydride and 0.6 mole of 1,4-butylene glycol are fed into the reaction vessel and the temperature is gradually increased up to 205° C., the polycondensation process being conducted until a polyester having an acid number of from about 35 to 42 mg KOH/g is obtained.

The product at a temperature of 150° C. is poured onto a cooled metal conveyor and subsequently copolymerized with styrene.

EXAMPLE 9

1 mole of the adduct of maleic anhydride and 2-naphthol and 1 mole of propoxylated Bisphenol A and 0.3 mole of 1,2-propylene glycol are heated under a blanket of an inert gas and with constant stirring in a reaction vessel fitted with a reflux condenser, the reaction mixture temperature being increased gradually from 130° to 200° C. as the reaction proceeds.

After the reaction mixture temperature has reached 200° C., the synthesis is conducted until an acid number of 40 mg KOH/g is attained.

After the reaction mixture has been cooled down to 140° C., 1 mole of 1,2-propylene glycol and 1.1 moles of maleic anhydride are fed into the reaction vessel and the mixture heated gradually up to the temperature of 200° C. until a polyester having an acid number of 35 mg KOH/g is obtained.

The obtained polyester is then copolymerized with styrene.

We claim:

1. A process for producing cured unsaturated polyester resins having a regular network structure which comprises the consecutive steps of (1) polycondensing a mixture of a crude diene adduct of 2-naphthol and maleic anhydride at a temperature within the range from 180° to 200° C. with an alcohol selected from the group consisting of aliphatic glycols and dihydric aromatic alcohols and mixtures thereof, in the ratio of from 0.1 to 3.0 moles of the alcohol per 1 mole of the adduct (2); condensing the resultant product at a temperature within the range from 160° to 210° C. with an unsaturated acid or the anhydride thereof and an alcohol selected from the group consisting of glycols and dihydric aromatic alcohols in a quantity equimolar to the unsaturated acids or anhydride; and (3) subsequently dissolving the product of step (2) in styrene and copolymerizing to obtain a cured polyester resin.

2. The process according to claim 1 wherein the dihydric aromatic alcohols are selected from the group consisting of the $C_2$ or $C_4$ alkoxy derivatives of 2,2-bis(p-hydroxyalkoxyphenyl) propane, bis(2-hydroxyalkoxy-)1,1' binaphthyl and bis(4-hydroxyalkoxy-1-naphthyl) methane.

3. The process according to claim 1 wherein the aliphatic glycols are selected from the group consisting of propylene glycol, diethylene glycol, dipropylene glycol and butylene glycol.

4. The process according to any one of claims 1 to 3, wherein the unsaturated acid is maleic acid or fumaric acid.

* * * * *